(12) United States Patent
Astleitner et al.

(10) Patent No.: US 7,099,303 B2
(45) Date of Patent: Aug. 29, 2006

(54) METHOD FOR TRANSMITTING CONTROL INFORMATION BETWEEN A LINE-SWITCHING AND A PACKET-SWITCHING COMMUNICATIONS NETWORK

(75) Inventors: Franz Astleitner, Baierbrunn (DE); Helmut Schmidt, Munich (DE); Ursula Glock, Munich (DE); Gregor Schneiders, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 775 days.

(21) Appl. No.: 09/924,975

(22) Filed: Aug. 8, 2001

(65) Prior Publication Data

US 2002/0075896 A1    Jun. 20, 2002

(30) Foreign Application Priority Data

Aug. 8, 2000   (DE)   .............................. 100 38 688

(51) Int. Cl.
*H04L 12/66* (2006.01)
*H04J 3/12* (2006.01)
*H04L 12/28* (2006.01)

(52) U.S. Cl. ............... 370/352; 370/401; 370/410; 370/467

(58) Field of Classification Search ............... 370/235, 370/236, 352, 353, 354, 389, 400, 401, 410, 370/467; 379/93.01, 93.07, 93.15, 219, 220.01, 379/229

See application file for complete search history.

(56) References Cited

U.S. PATENT DOCUMENTS

| | | | |
|---|---|---|---|
| 6,026,086 A * | 2/2000 | Lancelot et al. ............ | 370/353 |
| 6,324,280 B1 * | 11/2001 | Dunn et al. ................. | 379/230 |
| 6,587,456 B1 * | 7/2003 | Rao et al. ................... | 370/352 |
| 6,693,898 B1 * | 2/2004 | Su et al. ..................... | 370/355 |
| 6,795,444 B1 * | 9/2004 | Vo et al. ..................... | 370/401 |
| 2002/0044545 A1 * | 4/2002 | Brumm et al. .............. | 370/352 |
| 2002/0054590 A1 * | 5/2002 | Brumm et al. .............. | 370/353 |
| 2002/0064147 A1 * | 5/2002 | Jonas et al. ................. | 370/351 |
| 2002/0075851 A1 * | 6/2002 | Brumm et al. .............. | 370/352 |
| 2002/0181690 A1 * | 12/2002 | Kreten et al. ............... | 379/219 |

FOREIGN PATENT DOCUMENTS

WO     WO 00/11882     3/2000

OTHER PUBLICATIONS

IEEE Communications Magazine: "Supplementary Services in the H.323 IP Telephony Network", M. Korpi, V. Kumar, S. 118-125.
Korpi, M. et al., "Supplementary Services in the H.323 IP Telephony Network," IEEE Communications Magazine Jul. 1999, pp. 118-125.

* cited by examiner

Primary Examiner—Alpus H. Hsu
(74) Attorney, Agent, or Firm—Bell, Boyd & Lloyd LLC

(57) ABSTRACT

A method is provided for transmitting control information between a line-switching and a packet-switching communications network. A signaling connection is set up in a packet-switching network in order to transmit signaling packets which form connection-independent control information which relates to at least one service feature in a line-switching communications network so that at least one service feature of the line-switching communications network may be used in the packet-switching communications network by means of the control information independently of the connection.

14 Claims, 2 Drawing Sheets

METHOD FOR TRANSMITTING CONTROL INFORMATION BETWEEN A LINE-SWITCHING AND A PACKET-SWITCHING COMMUNICATIONS NETWORK

BACKGROUND OF THE INVENTION

The present invention relates to a method for transmitting control information between a line-switching and a packet-switching communications network.

Originally, various types of communications networks were developed in order to transmit voice, data and video data. Owing to the various options for use of these communications networks, different services were developed. For example, Voicemail was developed for use in conventional line-switching communications networks, and electronic mail was developed for use in packet-switching communications networks, such as the Internet. As of today, voice, data and video services can be handled by both types of communications networks. Supplementary services (such a call transfer and call forwarding) can now also be used in packet-switching communications networks. At the present time, Standards are being defined and discussed, for example in the H.323-based series of ITU-T Recommendations (H.323, H.225, H.450: ITU-T Recommendations) for packet-switching communications networks. An H.323 architecture for supplementary services is described on pages 118–125 of an article titled "Supplementary Services in the H.323 IP Telephony Network" by Markku Korpi and Vineet Kumar published in the IEEE Communications Magazine in July 1999. The article describes one option for interaction of services between line-switching and packet-switching communications networks.

This article introduces a solution approach relating to the way in which user-channel-related signaling messages for controlling, requesting and (de)activating service features offered in the line-switching communications network can be mapped onto signaling packets used in the packet-switching network in accordance with a standardized transmission protocol. The signaling messages in the line-switching communications network are preferably DSS1 messages, as defined in the ITU Standards Q.931 and Q.932. The standardized H.225 signaling protocol is preferably used as the transmission protocol for the signaling packets in the packet-switching communications network, in particular in the Internet. Service features whose use requires user-channel-related signaling messages are, for example, call transfer, triple subscriber and large conference calls, hold, display charge information, closed user group and call number identification services.

There is currently no mapping capability for mapping signaling messages onto such signaling packets, such as those mentioned above, in the packet-switching communications network for signaling messages which are used in the line-switching communications network, are independent of the user channel or user connection and which, in particular, [lacuna] (de)activation or registration of service features for private branch exchanges (PBX) which are connected to the line-switching communications network. Signaling which is independent of the user channel or of the user connection is required, for example, for status checking and for activation and deactivation of service features such as call forwarding, call completion on busy subscriber or on no reply (automatic callback when busy or when there is no answer), outgoing call barring, and message waiting indication.

One feasible form of analog mapping of signaling messages which are independent of the user channel onto signaling packets in the packet-switching communications network based on the mapping of signaling messages which are dependent on the user channel onto signaling packets encounters, in particular, the difficulty that the DSS1 signaling messages used in the line-switching communications network are subject to a different type of transmission mechanism than that for the H.225 signaling packets used in the packet-switching communications network. The transmission of DSS1 signaling messages relates only to a local signaling section, that is to say between a communications terminal or private branch exchange and a switching center. In this case, the transmission of signaling messages is not terminated at the DSS1 protocol level, but is accomplished by means of subordinate protocol layers. In contrast to this, H.225 signaling packets are transmitted point-to-point, that is to say over a number of signaling sections, with the transmission of signaling packets being terminated only after receiving an acknowledgement at the H.225 protocol level. The concepts used in the line-switching communications network for transmitting signaling messages which are independent of the user connection have no corresponding concepts in the signaling protocols used in the packet switching communications network.

SUMMARY OF INVENTION

An object of the present invention is to provide a method for transmitting control information between a line-switching and packet-switching communications network as well as apparatuses to support the method, such that the difficulties mentioned above are overcome.

One major aspect of the invention is that a signaling connection is set up in the packet-switching communications network in order to transmit signaling packets which define control information which is independent of the connection and is related to at least one service feature in the line-switching communications network. The control information in the signaling packets allows at least one service feature of the line-switching communications network to be used in the packet-switching communications network, independently of the connection. In this case, the use of the at least one service feature can relate to control, activation or deactivation, or to a request or a status check, or notification relating to the status of the service feature. In this context, control information which is independent of the connection is related to control information for the use of a service feature, for the transmission of which no user channel connection is required. In other words, the control information can be transmitted independently of the user connection.

This means that it is not just merely conversion or mapping of signaling messages into signaling packets and/or vice versa that takes place, since the setting up of a signaling connection in a packet-switching communications network defines a signaling section between two end points, whose termination is guaranteed. The control information which is transported independently of the user connection in the line-switching communications network and relates to at least one service feature can thus also be transmitted independently of the user connection in the packet-switching communications network, thus making it possible to save transmission resources in the packet-switching communications network.

One advantageous development of the invention provides for the integration of at least one control information item which relates to a service feature in the line-switching communications network in at least one signaling packet which initiates the setting up of a signaling connection. This means that the data blocks provided in the signaling packets are used optimally for transmitting control information.

When standardized DSS1 signaling messages are used in the line-switching communications network and H.225 signaling packets are used in the packet-switching communications network, a further refinement of the invention provides that a standard DSS1 REGISTER message or a standard DSS1 NOTIFY or FACILITY message with a DUMMY CALL REFERENCE (DCR) is integrated in an H.225 SETUP message which is defined in the Standard. It is thus possible to make use of the signaling messages defined in the H.225 signaling protocol for this procedure.

Furthermore, the invention provides apparatuses, in particular, a control unit for conversion of signaling messages, which are used in a line-switching communications network, to signaling packets which are used in a packet-switching communications network, and/or vice versa; a communication device, arranged in the line-switching communications network, preferably a switching device; and a communication terminal which is arranged in the packet-switching communications network, for example an H.323 terminal. These units and devices have, in particular, a module for integration and/or for extraction of user connection-independent control information, which relates to at least one service feature in the line-switching communications network, into and/or out of signaling packets to be transmitted. These apparatuses in particular support the method according to the invention, whose advantages also apply to these apparatuses.

Further refinements of the invention and their advantages will be explained in more detail using exemplary embodiments and with reference to a drawing, in which:

DETAILED DESCRIPTION OF THE INVENTION

In the exemplary embodiments, all the DSS1 signaling messages are tunneled into signaling packets, that is to say all the control information which there is in the DSS1 signaling message (message type and information elements) is represented by means of suitable parameters (for example nonStandard Data, nonStandardControl, tunneledSignalingMessage) in H.225 signaling packets or is written to a separate data block. As an alternative to this, it is possible to transmit the DSS1 information elements directly in the H.225 signaling packets.

Figure 1:
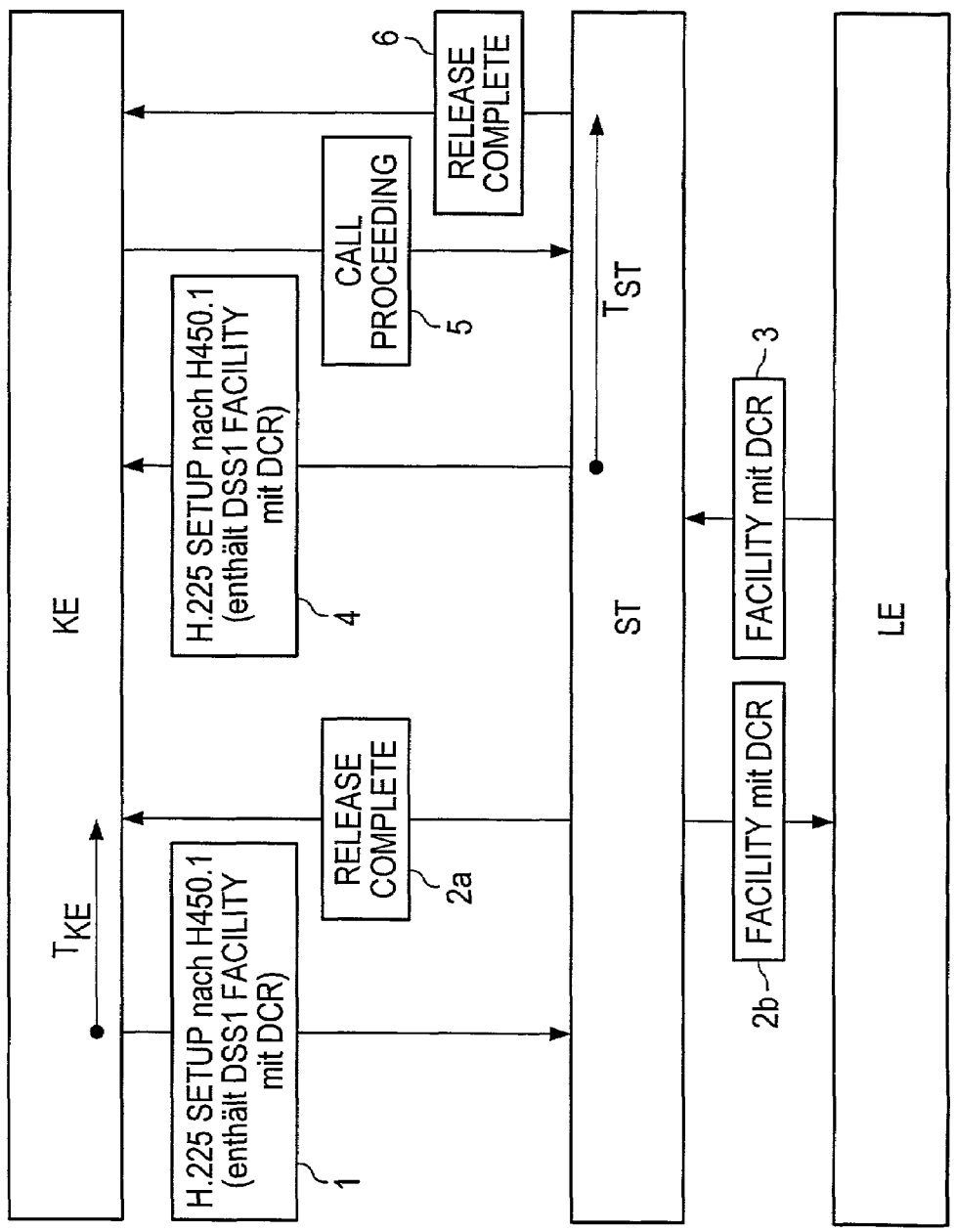
FIG. 1 shows a message flow, in which, for example, DSS1 signaling messages, which are independent of the user connection and have no connection, are mapped onto H.225 signaling packets.
Figure 2:
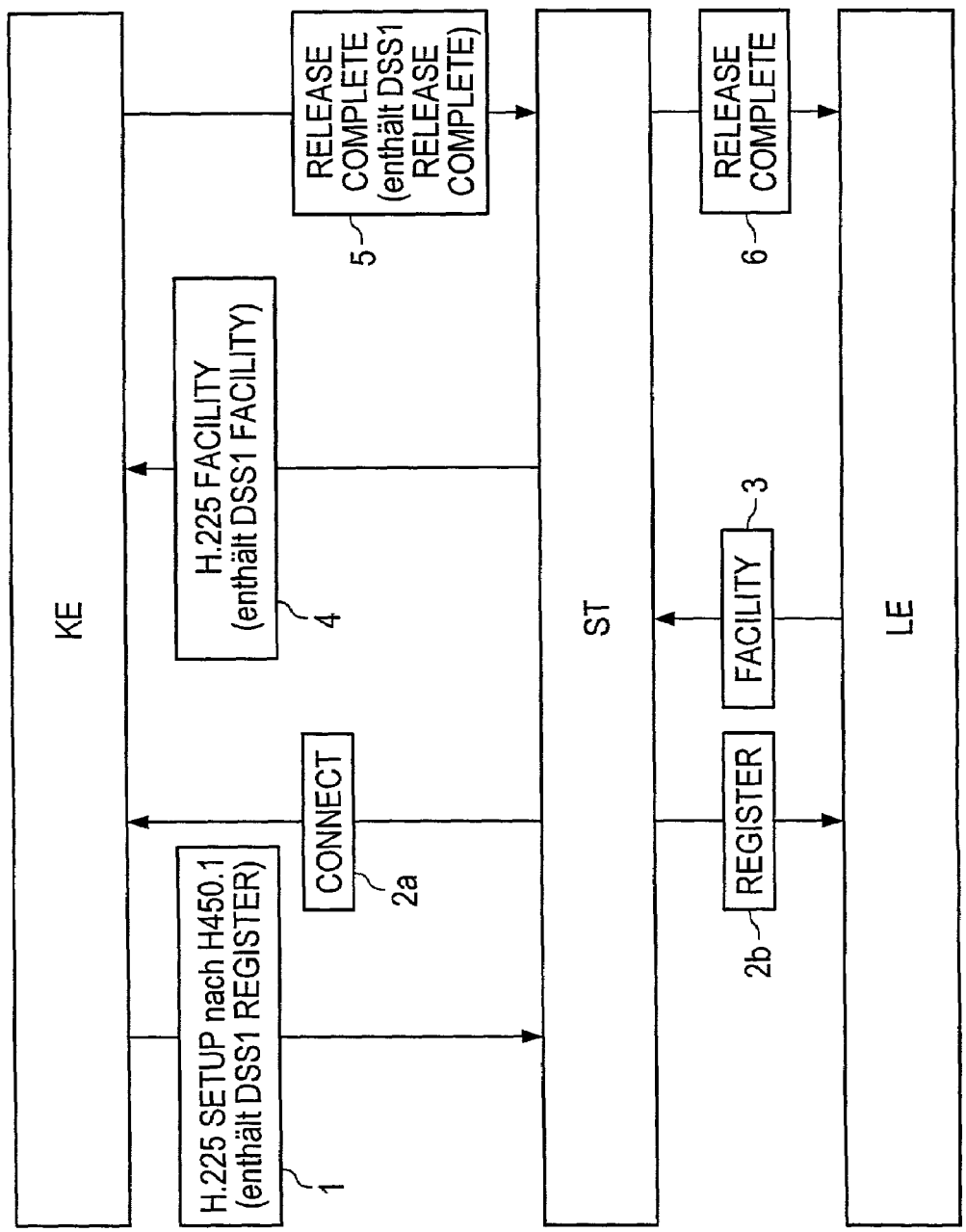
FIG. 2 shows a message flow, in which, for example, DSS1 signaling messages which are independent of the user connection but are connection-oriented are converted to H.225 signaling packets.

FIGS. 1 and 2 show the following network components, between which signaling messages or signaling packets, identified by steps 1–6 are interchanged. The figures show a communication terminal KE, for example an H.323 terminal, arranged in a packet-switching communications network, for example in the Internet, and a switching center LE, arranged in a line-switching communications network, for example a conventional telephone network. There is a control unit ST for protocol conversion between the two network components KE and LE mentioned. This control unit can also be integrated in one of the two units KE or LE.

FIG. 1 also shows two message flows, in each of which one DSS1 FACILITY signaling message with what is referred to as a DUMMY CALL REFERENCE (DCR) is transmitted between the components KE and LE. In the first case in this arrangement, the H.225 signaling connection which is used for transmission is ended in a manner which particularly conserves resources by the receiver of the H.225 SETUP message, for example by the control unit ST. In the second case (starting from step 3), the time-controlled ending of the H.225 signaling connection is demonstrated, which occurs if the connection is not cleared by the receiver.

In step 1, the communication terminal KE sends an H.225 SETUP message which contains a tunneled DSS1 FACILITY with the DUMMY CALL REFERENCE (DCR) to the control unit ST and starts a timer $T_{KE}$. In steps 2a and 2b, the control unit ST transmits the DSS1 FACILITY message to the switching center LE, and uses an H.225 RELEASE COMPLETE message to end the H.225 signaling connection which was previously set up by the communication terminal. When this message is received, the communication terminal stops the timer $T_{KE}$. In step 3, the switching center LE transmits a DSS1 FACILITY with the DCR to the control unit ST. This may be a response message to the previous FACILITY message. In step 4, the control unit ST sends an H.225 SETUP message, which contains the tunneled DSS1 FACILITY message with the DCR, to the communication terminal KE, and starts a timer $T_{ST}$. In step 5, the communication terminal KE acknowledges reception of the SETUP message by means of an H.225 CALL PROCEEDING message. In step 6, once a time interval which is defined by the timer $T_{ST}$ has elapsed, the control unit uses an H.225 RELEASE COMPLETE message to end the previously set-up H.225 signaling connection to the communication terminal.

This procedure can also be used analogously for transmitting DSS1 NOTIFY messages which are independent of the user connection.

FIG. 2 shows a message flow in which DSS1 signaling messages, for example the REGISTER message, which are independent of the user connection but are connection-oriented are tunneled into H.225 signaling packets.

In step 1, the communication terminal KE sends an H.225 SETUP message, which contains a tunnel DSS1 REGISTER message, to the control unit ST. In steps 2a and 2b, the control unit ST transmits a DSS1 REGISTER to the switching center LE, and acknowledges reception of the SETUP message by means of an H.225 CONNECT message which is transmitted in the direction of the communication terminal KE. In step 3, the switching center LE transmits a DSS1 FACILITY message, which is associated with the same signaling connection which was previously set up with the aid of the H.225 SETUP and DSS1 REGISTER message, to the control unit ST. In step 4, the control unit sends an H.225 FACILITY message, which contains the tunneled DSS1 FACILITY message, to the communication terminal KE. In step 5, the communication terminal uses an H.225 RELEASE COMPLETE message, which contains the DSS1 RELEASE COMPLETE message, to end the previously set-up H.225 signaling connection. In step 6, the control unit uses a DSS1 RELEASE COMPLETE message, which is sent to the switching center LE, to end the DSS1 connection.

There are various feasible mechanisms for ending the H.225 signaling connection disclosed in FIG. 2. This connection can be initiated by means of an H.225 RELEASE COMPLETE message, possibly containing a DSS1 RELEASE COMPLETE message, or by means of an H.225 FACILITY message, containing an DSS1 RELEASE message (standardized by the ETSI). This connection can also be ended once a specific time interval has elapsed or once a specific number of messages have been transmitted or received.

The invention claimed is:

1. A method for transmitting control information between a line-switching and a packet-switching communications network, comprising the steps of:
   converting user data signaling messages into signaling packets that are used between the line-switching network containing control information and the packet-switching communications network containing control information;
   setting up a signaling connection for transmitting signaling packets, which form connection-independent control information which relates to at least one service feature in the line-switching communications network, in the packet-switching network in order to use the at least one service feature of the line-switching communications network in the packet-switching communications network by means of the control information, independently of the connection.

2. The method as claimed in claim 1, further comprising the step of integrating the at least one control information item which relates to a service feature in the line-switching communications network into at least one signaling packet which initiates the setting up of a signaling connection.

3. The method as claimed in claim 2, further comprising the step of acknowledging the reception of the at least one signaling packet (H.225 SETUP) which initiates the setting up of a signaling connection.

4. The method as claimed in claim 2, wherein a data block for the at least one control information item which is to be transmitted and is independent of the user connection is provided within the at least one signaling packet.

5. The method as claimed in claim 2, further wherein specific parameters for the at least one control information item which is to be transmitted and is independent of the user connection are defined within the at least one signaling packet.

6. The method as claimed in claim 1 further comprising terminating a signaling connection after receiving an acknowledgement, after a defined time interval has passed, or after a defined number of signaling packets have been transmitted.

7. The method as claimed in claim 1, wherein the use of the at least one service feature in the line-switching communications network relates to the control or request, or activation or deactivation, or status check or notification relating to the status thereof.

8. The method as claimed in claim 1, wherein IP-based protocols are used for transmitting the signaling packets in the packet-switching communication network.

9. The method as claimed in claim 1, wherein a signaling message which is used in the line-switching communications network and contains control information is represented by a DSS1 message.

10. The method as claimed in claim 1, wherein a signaling packet which is used in the packet-switching network and contains control information is represented by an H.225 message.

11. The method as claimed in claim 10, wherein a standard DSS1 REGISTER message or a standard DSS1 NOTIFY or DSS1 FACILITY message is integrated with a DUMMY CALL REFERENCE in an H.225 SETUP message.

12. A control unit for conversion of user data signaling messages used between a line-switching communications network containing control information, to signaling packets used in a packet-switching communications network containing control information, the control unit is arranged at the transmitter or receiver end of a signaling connection which is set up in the packet-switching communications network for transmitting signaling packets, and having a module for integration and extraction of connection-independent control information, which relates to at least one service feature in the line-switching communications network, into and out of the signaling packets to be transmitted.

13. A communication device arranged in a line-switching communications network, the communication device comprising a module for integration and for extraction of connection-independent control information which relates to at least one service feature in the line-switching communications network into and out of user data signaling packets to be transmitted.

14. A communications terminal, arranged in a packet-switching communications network, the communications terminal comprising a module for integration and for extraction of connection-independent control information which relates to at least one service feature in the line-switching communications network into and out of user data signaling packets to be transmitted.

* * * * *